United States Patent [19]

Tyrtyshny et al.

[11] 4,256,536

[45] Mar. 17, 1981

[54] EVAPORATOR

[76] Inventors: Vladilen M. Tyrtyshny, Grazhdansky prospekt, 105, korpus 1, kv. 58; Albert A. Bolotov, ulitsa Nalichnaya, 45, korpus 1, kv. 43, both of Leningrad, U.S.S.R.

[21] Appl. No.: 46,638

[22] Filed: Jun. 8, 1979

[51] Int. Cl.³ ............................................. B01D 1/06
[52] U.S. Cl. .............................. 159/16 S; 159/27 R; 159/17 R
[58] Field of Search ............... 159/16 S, 16 R, 26 R, 159/27 R, 27 A, 27 B, 27 D

[56] References Cited

U.S. PATENT DOCUMENTS

| 984,754 | 2/1911 | Eijdman | 159/27 B |
|---|---|---|---|
| 2,676,651 | 4/1954 | Lavigne | 159/16 S |

*Primary Examiner*—Norman Yudkoff
*Attorney, Agent, or Firm*—Lackenbach, Lilling & Siegel

[57] ABSTRACT

An evaporator including a shell, upper and lower pulp chambers, and a heating chamber disposed therebetween, the chambers being formed by upper and lower transverse tube sheets mounted in the shell. Rigidly connected to said tube sheets are vertical tube members for heating liquor to be evaporated circulating therethrough. In the upper pulp chamber, mounted on the central portion of the upper transverse tube sheet is a boiling chamber of the liquor to be evaporated. The upper and lower pulp chambers and the boiling chamber are divided by upper and lower vertical partitions into twin sections. The twin sections of the lower pulp chamber are provided with connections for feeding the liquor to be evaporated, which are connected to a switch via a common pipeline. The twin sections of the upper pulp chamber are provided with connections for removal of the pulp, which are also connected to a switch via a common pipeline, whereas the twin sections of the boiling chamber are connected via a common pipeline to a connection for removal of non-condensable gases and to a self-evaporator of a connection for removal of condensate of the heating medium to be delivered into the heating chamber.

6 Claims, 7 Drawing Figures

EVAPORATOR

FIELD OF THE INVENTION

The present invention relates to production equipment for processing a variety of liquors, and more particularly to evaporators.

The proposed evaporator can be used to best advantage to evaporate aluminate liquors serving as a row material for production of aluminium.

BACKGROUND OF THE INVENTION

At the present time in the production of aluminium, it is customary to evaporate aluminate liquors in multiple effect evaporator systems consisting of a set of evaporators arranged in series. Said evaporators are intended to concentrate liquors or to deposit in part solid fractions from these liquors, the liquid fraction being drawn off as a vapour due to heating the liquor with a heating medium. In a multiple effect evaporator system, the evaporators are connected with each other by means of a pipeline and vapour pipeline system so that the heating medium and the superheated liquor to be evaporated successively pass through all the evaporators. In the evaporators, steam is generally used as a heating medium.

The scheme of connection of evaporators is referred to as a direct-flow one when the flow direction of the heating medium and that of the liquor to be evaporated coincide, whereas the scheme of connection of evaporators in such a system is referred to as a counter-flow one when the flow directions of the heating medium and the liquor to be evaporated from one evaporator to another are oppositely directed. A mixed connection of evaporators in an evaporator system is also possible, the direct-flow and counter-flow schemes of connection of the evaporators being combined in such a system.

Known in the art are evaporators having forced circulation of the liquor to be evaporated, comprising upper and lower pulp chambers and a heating chamber disposed there-between. Mounted in the heating chamber are vertical tube members heated with a heating medium. Liquor to be evaporated is pumped via a distribution device to the top open ends of the tube members and runs down inside these members and starts boiling due to heat absorption from the heating medium. The two phases therewith being separated, namely vapour and the evaporated liquor of a higher concentration which is substantially a pulp. The vapour evolved on boiling of the liquor is discharged from the inside of the evaporator via a vapour pipeline and the pulp is pumped from the lower pulp chamber into the upper pulp chamber of the same evaporator.

Among the disadvantage of forced circulation evaporators is their intricate construction conditioned by the use of the distribution device and pump.

Evaporators with natural circulation of the liquor to be evaporated are of more simple design, wherein the insides of the upper and lower pulp chambers are connected via outside circulation tubes arranged on both sides of the evaporator shell. In these evaporators, similarly to evaporators with forced circulation of the liquor to be evaporated, said liquor enters inside the vertical tube members of the heating chamber and starts boiling there, and a vapour column is formed in the top portion of these members. Thus, a difference in height occurs between the columns of the liquor to be evaporated in the outside circulation tubes of the evaporator and the columns of the liquor to be evaporated in the vertical tube members of the heating chamber, which results in a circulation head ensuring the natural circulation of the liquor to be evaporated between the upper and lower pulp chambers through the vertical tube members of the heating chamber and through the outside circulation tubes.

Among the disadvantages of evaporators having the boiling zone located inside vertical tube members of the heating chamber is the fact that the boiling of the liquor to be evaporated is accompanied with separation and deposition of the solid phase (salts) on the inner surface of the vertical tube members, i.e. incrustation of these members around the cross-section occurs. This results in decreasing coefficient of heat transfer from the heating medium through the walls of the vertical tube members to the liquor to be evaporated circulating therethrough, thereby decreasing the output of the evaporator. Besides, this entails frequent washings of the evaporator which is to be laid up for the washing period, which, in turn, exerts a detrimental effect on the output of the evaporator.

Said disadvantages are inherent in both groups of evaporators having the boiling zone located inside of the tube members, namely the evaporators with natural circulation of the liquor to be evaporated and the evaporators with forced circulation of such a liquor.

Also known in the art is an evaporator with the boiling zone external with respect to the vertical tube members of the heating chamber (cf., for example, GOST 11987--66, M., 1974, type I, version 5).

The evaporator comprises a shell and upper and lower pulp chambers, and a heating chamber disposed therebetween. All said three chambers are formed by two transverse tube sheets rigidly secured on the innerside of the evaporator shell. Rigidly connected with their ends to the transverse tube sheets are vertical tube members. Disposed in the upper pulp chamber, coaxially to said chambers, is a boiling chamber of the liquor to be evaporated, shaped as a cylindrical sleeve mounted on the central portion of the upper transverse tube sheet. The evaporator is also provided with connections for feeding the liquor to be evaporated and the heating medium into the evaporator, connections for removal of vapour and pulp from this evaporator, and also connections for removal of non-condensable gases and condensate of the spent heating medium.

In the prior art evaporator described, the boiling chamber of the liquor to be evaporated mounted on the central portion of the upper transverse tube sheet over the vertical tube members has a rather considerable height. Hence, liquid column located in the boiling chamber over the vertical tube members of the heating chamber exerts a considerable pressure upon lower layers of the liquor to be evaporated, contained in the vertical tube members, which prevents the liquor to be evaporated from boiling within these members. As for boiling, it occurs in the top portion of the boiling chamber. A disadvantage of the evaporator described consists in incrustation of the vertical tube members around their cross-section due to deposition of the solid phase on the inside of said members, which solid phase is separated during boiling and circulation of the liquor to be evaporated. Even though this shortcoming inherent in the evaporator design having the boiling zone external to the vertical tube members is much lesser as compared to the evaporators described above, wherein the boiling zone is located inside of the vertical tube members, yet it still exists.

Another disadvantage of the prior art evaporator described consists in a rather low intensity of the liquor evaporating process since a great deal of energy of the circulating liquor is wasted to overcome the resistance in the hydroulic circuit of the evaporator. As a consequence, the evaporator described can be sufficiently usable only in a multiple effect evaporator system operating the direct-flow scheme, wherein the energy of the superheated evaporated liquor is sufficient to ensure an intensive circulation of the pulp. However, when employing a couter-flow multiple effect evaporator system, wherein said evaporator is the first body in the direction of the heating medium and the last one in the direction of the liquor to be evaporated, the liquor coming to the evaporator is not superheated and cannot therefore promote the intensification of the pulp circulation in the evaporator.

SUMMARY OF THE INVENTION

It is an object of the present invention to decrease the rate of incrustation of the vertical tube members around the cross-section through elimination of salt deposition on the insides of these members.

It is another object of the present invention to promote intensification of the pulp circulation in the evaporator through the utilization of the energy of the spent heating medium.

With these objects in view, the present invention includes evaporator comprising a shell, upper and lower pulp chambers, and a heating chamber disposed therebetween, the chamber being formed by upper and lower transverse tube sheets mounted in the shell, to which tube sheets there are rigidly connected vertical tube members for heating the liquor to be evaporated circulating therethrough. A boiling chamber for the liquor to be evaporated, mounted in the upper pulp chamber on the central portion of the upper transverse tube sheet, connections for feeding the liquor to be evaporated into the boiling chamber and a heating medium into the heating chamber, and also connections for removal of vapour and pulp from the upper pulp chamber, and a connection for removal of condensate and non-condensable gases of the spent heating medium from the heating chamber, wherein, according to the invention, the lower and upper pulp chambers and boiling chamber are divided by vertical partitions into twin sections, the twin sections of the upper pulp chamber being communicated with each other. The connections for feeding the liquor to be evaporated and removal of the pulp being in communication with each of the sections of the lower and upper pulp chambers and each pair of the respective connections being connected via a common pipeline to a switch for feeding the liquor or removal of the pulp alternatively to one or another of these connections, while the twin sections of the boiling chamber are connected via a common vapour pipeline to the connection for removal of non-condensable gases of the heating medium and via a self-evaporator, to the connection for removal of condensate of the spent heating medium.

The vertical partitions in the boiling chamber and in the upper and lower pulp chambers make it possible to divide the evaporator in the axial direction into two halves, in each of which an independent circulation of the liquor to be evaporated occurs. As this takes place, in that half of the evaporator where the liquor be evaporated is fed to, the circulation of the liquor is accompanied with dissolving of the salts deposited on the inside of the vertical tube members of this half of the evaporator. In the other half of the evaporator, where the pulp, i.e. more concentrated evaporated liquor, is bled from, the process of circulation of the liquor to be evaporated is accompanied with recovery of salts depositing on the inside of the tube members. The switches incorporated in the evaporator enable alternative direction change of feeding the liquor to be evaporated into one or another half of the evaporator and bleeding the finished pulp from respective halves of the evaporator. The communication of the twin sections of the boiling chamber with the connection for removal of non-condensable gases and with the self-evaporator of the connection for removal of condensate of the spent heating medium makes it possible to guide the flows of non-condensable gases and vapour into the zone of boiling of the liquor to be evaporated.

It is advisable to mount in the upper pulp chamber guide members to guide the evaporated liquor, designed as two plates bent over the sections of the upper pulp chamber and the boiling chamber of the liquor to be evaporated.

The installation of the bent guide members enables each of the flows of the evaporated liquor, circulating in a certain half of the evaporator, to be introduced into the respective half of this evaporator.

It is expedient to use in the evaporator a contact preheater connected to the connection for removal of vapour from the upper pulp chamber and to pipeline for feeding the liquor to be evaporated.

Such a contact preheater enables an additional preheating of the liquor to be evaporated drawn from the foregoing evaporator of the multiple effect evaporator system, due to the energy of the vapour discharging from the upper pulp chamber. Furthermore, condensate collected in the contact preheater provides, while entering the pipeline for feeding the liquor to be evaporated, dilution of this liquor and decreasing its concentration.

It is advisable to mount a distribution device on the vapour pipeline connecting the twin sections of the boiling chamber to the connection for removal of non-condensable gases and to the self-evaporator of the connection for removal of condensate of the spent heating medium in the zone of connecting this vapour pipeline to the boiling chamber.

The distribution device ensures a uniform distribution of the flow drawn through said vapour pipeline in the boiling chamber.

It is practicable to make the distribution device as a perforated tip mounted in the inside of the boiling chamber.

Such an embodiment of the distribution device makes it possible to increase the charging of the central portion of the boiling chamber with vapour, that generally has a lack of vapour enrichment.

At the same time, it is advisable to fashion the distribution device as a closed bow surrounding the boiling chamber, the openings being provided in the walls of the chamber in the zone where said box surrounds it.

Such an embodiment of the distribution device provides the most ease of fabrication, features simplicity and makes it possible to use the common vapour pipeline connecting the twin sections of the boiling chamber with the connection for removal of non-condensable gases and with the self-evaporator of the connection for removal of condensate of the spent heating medium to the boiling chamber of the liquor to be evaporated on the side of the evaporator at the boiling zone level, or somewhat below, thereby providing the minimum length of this vapour pipeline required.

BRIEF DESCRIPTION OF THE DRAWINGS

Above and other objects and also novel features and advantages of the present invention will best be understood from a consideration of the following detailed description of the preferred embodiment when used in connection with the accompanying drawings, in which.

DETAILED DESCRIPTION OF THE INVENTION

Figure 1:
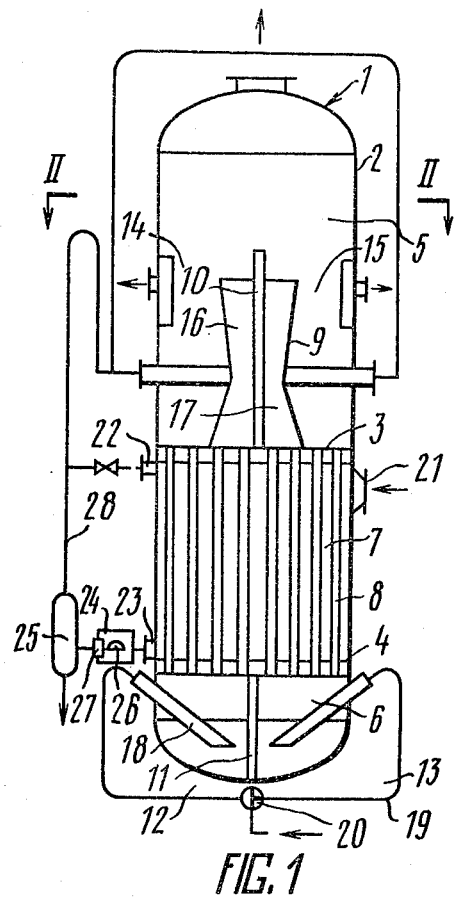
FIG. 1 shows an evaporator, according to the invention, longitudinal section.

The evaporator 1 (FIG. 1) comprises a vertical cylindrical end-rounded shell 2, on the inner surface of which there are rigidly mounted upper and lower transverse tube sheets 3 and 4, thereby forming three coaxial chambers: upper and lower pulp chambers 5 and 6, respectively, intended for collection and exposition of pulp, and a heating chamber 7 disposed therebetween intended for heating the liquor to be evaporated.

Accommodated inside of the heating chamber 7 are vertical tube members 8 for circulation of the liquor to be evaporated therethrough, rigidly connected with their ends to the upper and lower transverse tube sheets 3 and 4.

Mounted in the upper pulp chamber 5, coaxially thereto, is a boiling chamber 9 of the liquor to be evaporated. Said chamber is formed by a pair of funnels with their narrowed ends directed axially toward each other, and has both ends open and is mounted with one of said opened ends on the central portion of the upper transverse tube sheet 3. To provide for the repair of the evaporator 1 involving a replacement of the vertical tube members 8, the boiling chamber 9 is freely mounted on the upper transverse tube sheet 3.

The lower pulp chamber 6, the boiling chamber 9, and a portion of the upper pulp chamber 5 disposed between the upper transverse tube sheet 3 and the top end of the boiling chamber 9 are divided by upper and lower vertical partitions 10 and 11 into twin sections: left-hand and right-hand sections 12 and 13, respectively, of the lower pulp chamber 6, left-hand and right-hand sections 14 and 15, respectively, of the upper pulp chamber 5, left-hand and right-hand sections 16 and 17, respectively, of the boiling chamber 9. Also located in the upper vertical partition 10 are openings 10' through which the sections 14 and 15 of the upper pulp chamber 5 communicate with each other.

The twin sections 12 and 13 of the lower pulp chamber 6 are provided with connection 18 for feeding the liquor to be evaporated, connected to each other outside the shell 2 of the evaporator 1 via a pipeline 19 equipped with a switch 20 for alternative feeding the liquor to be evaporated into the sections 12 and 13 of the lower pulp chamber.

The heating chamber 7 is equipped with a connection 21 for feeding a heating medium into the intertubular space of this chamber, with a connection 22 for removal of non-condensable gases, and with a connection 23 for removal of condensate of the spent heating medium. Successively mounted on the connection 23 for removal of condensate are a condensate discharger 24 and a self-evaporator 25. The condensate discharger 24 is made in the form of a reservoir with a float 26 coupled with a valve 27 for overlapping the outlet opening of this reservoir according to the level of the condensate.

The self-evaporator 25 is made in the form of a closed container serving the purpose of starting boiling of the condensate due to the pressure drop in the connection 23 for removal of the condensate and in the self-evaporator 25.

The sections 16 and 17 of the boiling chamber 9 are connected via a common vapour pipeline 28 to the connection 22 for removal of non-condensable gases and to the self-evaporator 25 of the connection 23 for removal of condensate of the spent heating medium.

Figure 2:
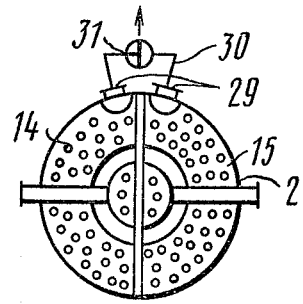
FIG. 2 is a sectional view taken on the line II—II of FIG. 1.

In the twin sections 14 and 15 (FIG. 2) of the upper pulp chamber 5, at a level corresponding to the top end of the boiling chamber 9, there are provided connections 29 for removal of pulp, connected to each other outside the shell 2 of the evaporator 1 via a pipeline 30 for bleeding the pulp. Said pipeline is equipped with a switch 31 for alternative bleeding the pulp from the sections 14 and 15 of the upper pulp chamber 5. The level, at which the connections 29 for removal of pulp are located, is an interface of two media: liquid one (pulp) and gaseous one (vapour) formed upon boiling the liquor to be evaporated, which interface divides the upper pulp chamber 5 into two parts: an upper one serving as a separator of the vapour to be removed from this part of the chamber 5 via the connection 32, and a lower one serving as a pulp collector.

Figures 3, 4:
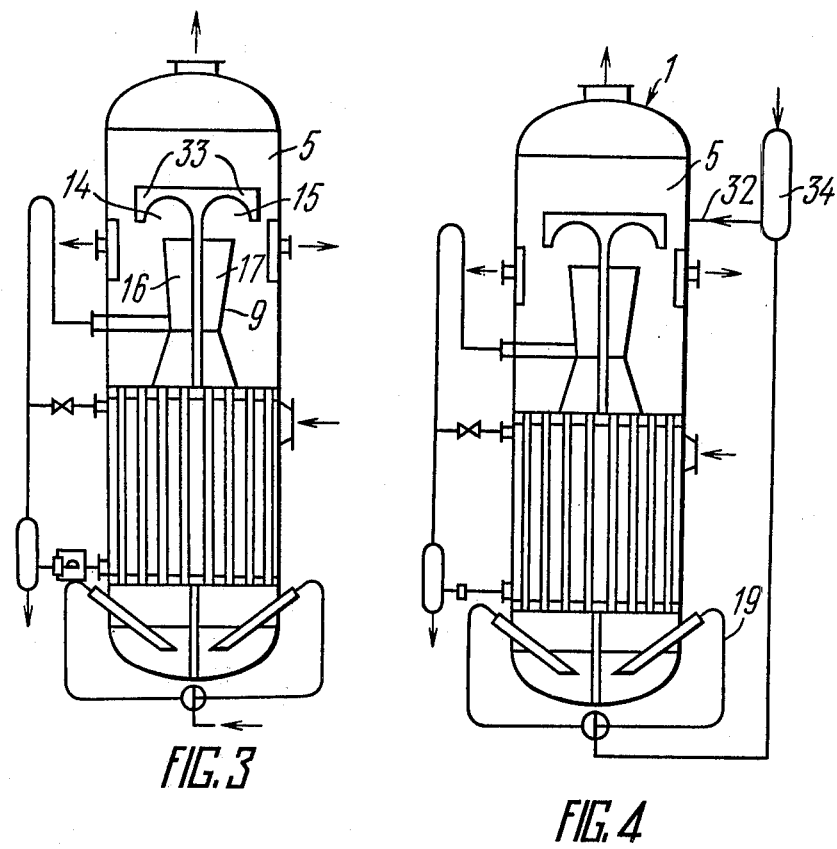
FIG. 3 shows an evaporator, according to the invention, with guide members for the evaporated liquor, mounted in the upper pulp chamber, longitudinal section.
FIG. 4 shows an evaporator, according to the invention, with a contact preheater connected to the connection for removal of vapour from the upper pulp chamber and to the pipeline for feeding the liquor to be evaporated, longitudinal section.

In the embodiment of the invention illustrated in FIG. 3, there are two guide members 33 mounted over the sections 16 and 17 of the boiling chamber 9 and the sections 14 and 15 of the upper pulp chamber 5 and fashioned as plates bent over said sections and providing an extension of the upper vertical partition 10.

In another embodiment of the invention illustrated in FIG. 4, the evaporator 1 is equipped with a contact preheater 34 connected to the pipeline 19 for feeding the liquor to be evaporated and to the connection 32 for removal of vapour from the upper pulp chamber 5.

Figure 5:
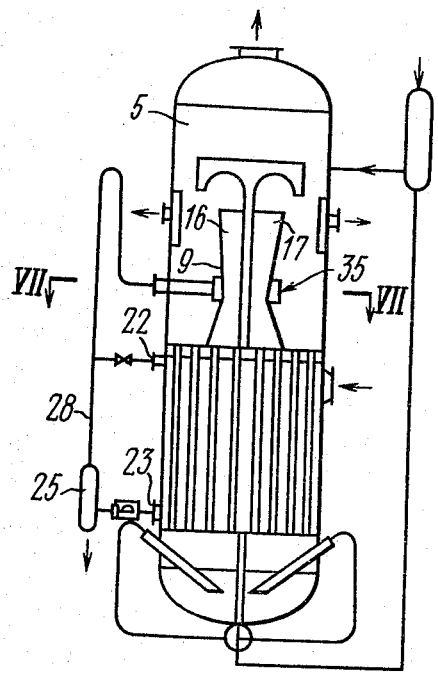
FIG. 5 is an evaporator, according to the invention, with a distribution device mounted in the zone where the vapour pipeline is connected to the boiling chamber of the liquor to be evaporated, longitudinal section.

In the embodiment of the invention illustrated in FIG. 5, the vapour pipeline 28 for connecting the sections 16 and 17 of the boiling chamber 9 to the connection 22 for removal of non-condensable gases and to the self-evaporator 25 of the connection 23 for removal of condensate of the spent heating medium is equipped with a distribution device 35, mounted in the zone of connecting said vapour pipeline with the boiling chamber 9.

In the embodiment of the distribution device 35 illustrated in FIG. 6, said device is made as a perforated tip 36 inserted inside the narrowed portion of the boiling chamber 9, somewhat below the boiling zone.

Figure 7:
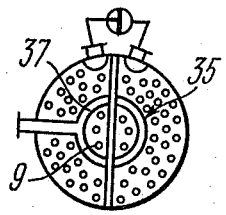
FIG. 7 is a sectional view taken on the line VI—VI of FIG. 6, showing another embodiment of the distribution device fashioned as a box surrounding the boiling chamber of the liquor to be evaporated.

In another embodiment of the distribution device 35 illustrated in FIG. 7, said device is made as a closed box 37 surrounding the narrowed portion of the boiling chamber 9 in which there are made openings (not shown in the drawings) provided for communication of the vapour pipeline 28 with the inside of the boiling chamber 9. The closed box 37 is secured on the outer surface of the boiling chamber 9.

The evaporator 1 operates as follows.

The liquor to be evaporated is fed under pressure via the pipeline 19 and the left-hand connection 18 into the left-hand section 12 of the lower pulp chamber 6 and via the central vertical tube members 8 of the left-hand half of the evaporator 1 enters the left-hand section 16 of the boiling chamber 9. Further, the liquor to be evaporated heated in the vertical tube members 8 which are heated with a heating medium fed in the heating chamber 7 through the connection 21, enters the boiling chamber 9 and starts boiling in the top portion of this chamber, two phases being formed: gaseous one in form of vapour, and liquid one in form of pulp, which is, as mentioned above, an evaporated liquor of higher concentration as compared to the liquor which enters into the boiling chamber 9. The vapour evolved upon boiling of the liquor is collected in the separator of the upper pulp chamber 5 and is discharged from the evaporator 1 via the connection 32. This vapour can be further supplied to the next evaporator of a multiple effect evaporator system. The pulp formed during this process in the left-hand section 14 of the upper pulp chamber 5 is exposed there, whereupon it runs down into the left-hand section 12 of the lower pulp chamber 6 through the peripheral vertical tube members 8 of the left-hand half of the evaporator 1, and then again rises into the boiling chamber 9 of the liquor to be evaporated through the central vertical tube members 8, thereby providing a circulating flow. Height difference of the column of the non-boiling pulp over the vertical tube members 8 in the upper pulp chamber 5 and the column of the boiling liquor in the boiling chamber 9 produces a circulation head required to ensure the circulation of the pulp between the upper pulp chamber 5 and the lower pulp chamber 6 through the vertical tube members 8 of the heating chamber 7. Thus, the pulp circulating between the left-hand sections 12 and 14 of the upper and lower pulp chambers 6 and 5, respectively, and evaporated to saturation state dissolves slats deposited on the inside of the vertical tube members 8.

In the course of evaporating the liquor, while heating the vertical tube members 8, the heating medium is condensated, non-condensable gases being evolved therewith. As this takes place, the non-condensable gases volatilize through the connection 22 and the condensate of the spent heating member is bled into the self-evaporator 25 via the connection 23 for removal of condensate and the condensate discharger 24. The condensate starts boiling there due to pressure difference in the connection 23 and in the inside of the self-evaporator 25. The vapour evolved upon boiling the condensate enters, through the vapour pipeline 28 and the distribution device 35, the narrowed portion of the boiling chamber 9, and the condensate is bled through the outlet opening (not shown in the drawings) of the self-evaporator 25. When passing through the boiling layer of the pulp, the vapour-gas mixture of this vapour and of the liquor to be evaporated enlarges the boiling zone in height, thereby rising the circulation head, thus intensifying the circulation of the liquor to be evaporated.

The liquor evaporated to saturation state flows continuously through the openings of the upper vertical partition 10 into the right-hand half of the evaporator where a continuous circulation of the liquor to be evaporated between the right-hand sections 13 and 15 of the lower and upper pulp chambers 6 and 5, respectively, also occurs, the circulation here, as distinguished from that in the left-hand half of the evaporator 1, being accompanied by salt separation due to higher concentration of the circulating liquor and by deposition of these salts on the inside of the vertical tube members 8. The finished pulp is bled from the right-hand section 15 of the upper pulp chamber 5 through the connection 29 and the pipeline 30 for pulp bleeding with the switch 31, wherefrom it is further delivered to the next evaporator of a multiple effect evaporator system. In time, sufficient to wash the left-hand half of the evaporator 1, the lower and upper switches 20 and 31 come simultaneously in such a position, whereby the liquor to be evaporated is fed into the right-hand section 13 of the lower pulp chamber 6 and the finished pulp is bled from the left-hand section 14 of the upper pulp chamber 5. As this takes place, circulation of a low concentration liquor occurs in the right-hand half of the evaporator 1, which ensures washing of the vertical tube members 8 of this half of the evaporator, while a high concentration liquor circulates in the left-hand half of the evaporator where the liquor evaporation process is accompanied by a deposition of salts on the inside of the vertical tube members 8. The position of the switches 20 and 31 is automatically changed over by a timer (not shown in the drawing).

In the embodiment of the invention shown in FIG. 3, the liquor to be evaporated circulating in a certain half of the evaporator 1 strikes vigorously against the surface of the guide member 33, while passing a section of the boiling chamber 9 corresponding to this half of the evaporator and shooting out of the boiling zone, and is drawn, enveloping said surface, into the same half of the evaporator 1.

In the embodiment of the invention, illustrated in FIG. 4, the liquor to be evaporated is preheated with the vapour supplied from the upper pulp chamber 5 into the contact preheater 34 and is diluted at the same time with the condensate of this vapour, which results in decreasing concentration of the liquor to be evaporated.

In the embodiment of the invention illustrated in FIG. 5, the mixture of non-condensable gases and vapour of the condensate of the spent heating medium evolved in the self-evaporator enters the distribution device 35 through the common vapour pipeline 28.

Figure 6:
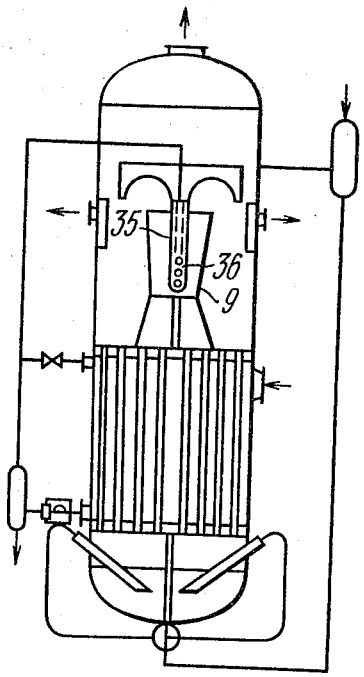
FIG. 6 is an embodiment of the distribution device fashioned as a perforated tip mounted in the inside of the boiling chamber, according to the invention, longitudinal section.

One form of the distribution device 35 is illustrated in FIG. 6, wherein the mixture of non-condensable gases and the vapour evolved upon boiling the condensate of the spent heating medium is delivered from the vapour pipeline 28 into the perforated tip 36 mounted in the narrowed portion of the boiling chamber 9 and then shoots through the openings of this tip into the boiling zone of the liquor to be evaporated.

In another form of the distribution device 35 illustrated in FIG. 7, the mixture of non-condensable gases and condensate of the spent heating medium is delivered from the vapour pipeline 28 into the closed box 37 surrounding the narrowed portion of the boiling chamber 9 and enters the boiling zone of the liquor to be evaporated through the openings made in this portion of the chamber.

The proposed evaporator with the vertical partitions 10 and 11 dividing longitudinally the evaporator 1 into two halves, each having an independent circulation of the liquor having a high and a low concentration, provides the alternative periodic washing of said halves of this evaporator. No laying-off of the evaporator 1 for a washing period is needed and the output of this evaporator is thereby increased.

The present invention is characterized, as compared to conventional evaporators, by a high intensity of circulation of the liquor to be evaporated because of an increase in the heat transfer coefficient of the vertical tube members 8 due to elimination of the incrustation of these members around their cross-section. The utilisation of the energy of the spent heating medium supplied from the connection 22 for removal of non-condensable gases and self-evaporator 25 of the connection 23 for removal of the condensate of the heating medium also promotes intensification of circulation of the liquor to be evaporated. The distribution device 35 featuring simplicity of design enables a uniform distribution of the spent heating medium energy in the zone of boiling of the liquor to be evaporated, as well as an enrichment with vapour of the central portion of the boiling chamber 9. The preheating of the liquor to be evaporated in the contact preheater 35 also promotes intensification of circulation of the liquor to be evaporated.

The present invention ensures stability of circulation direction of the liquor to be evaporated, enabling to prevent the liquor of a lower concentration from entry into that half of the evaporator 1 where circulation of the liquor of a higher concentration occurs, and vice versa. Such a stability is attained by installation of the guide members 33 over the sections 16 and 17 of the boiling chamber 9 of the liquor to be evaporated and the sections 14 and 15 of the upper pulp chamber 5.

The feeding of the mixture of the vapour and non-condensable gases of the spent heating medium into the boiling chamber 9 of the liquor to be evaporated via the distribution device 35 also contributes to circulation direction stability.

In connection with the foregoing it will be understood that the evaporator according to the present invention can advantageously be used as a part of various multiple effect evaporator systems operating a direct-flow, counter-flow or mixed scheme. Even though said embodiment is more suitable for a counter-flow multiple effect evaporator system, it will be also apparent that it can be successfully used in any other system as well.

We claim:
1. An evaporator comprising: a shell;
upper and lower pulp chambers and a heating chamber arranged therebetween, the chambers being formed by upper and lower tube sheets mounted in the shell;
a plurality of vertical tube members for heating the liquor to be evaporated circulating therethrough, rigidly connected to said upper and lower transverse tube sheets;
a boiling chamber of the liquor to be evaporated mounted in said upper pulp chamber on the central portion of said upper transverse tube sheet;
upper and lower vertical partitions dividing said upper and lower pulp chambers and boiling chamber into twin sections, the twin sections of said upper pulp chamber being in communication with each other;
connections for feeding the liquor to be evaporated into said boiling chamber, said connections being in communication with said twin sections of said lower pulp chamber and being connected via a common pipeline to a switch of a connection for feeding a heating medium into said heating chamber;
a connection for removing non-condensable gases and a connection for removing the condensate of the spent heating medium equipped with a self-evaporator, said connections being connected via a common vapour pipeline to said twin sections of the boiling chamber;
connections for removing pulp from said twin sections of the upper pulp chamber, connected via a common pipeline to a switch; and
a connection for removing vapour from said upper pulp chamber.

2. An evaporator as claimed in claim 1, wherein guide members are mounted in said upper pulp chamber to guide the evaporated liquor, said guide members being two plates bent over said twin sections of the upper pulp chamber and the boiling chamber of the liquor to be evaporated.

3. An evaporator as claimed in claim 1, further comprising a contact preheater connected to said connection for removing vapour from said upper pulp chamber and to said pipeline for feeding the liquor to be evaporated.

4. An evaporator as claimed in claim 1, wherein said vapour pipeline for connecting said twin sections of the boiling chamber to said connection for removing non-condensable gases and to said self-evaporator of the connection for removal of the condensate of the spent heating member is equipped, in the zone of connecting to said boiling chamber of the liquor to be evaporated, with a means for distribution.

5. An evaporator as claimed in claim 4, wherein said means for distribution is a perforated tip mounted within said boiling chamber.

6. An evaporator as claimed in claim 4, wherein said means for distribution is made as a closed box surrounding said boiling chamber of the liquor to be evaporated, and in the walls of said boiling chamber there are a plurality of openings in the zone where said box surrounds same.

* * * * *